UNITED STATES PATENT OFFICE.

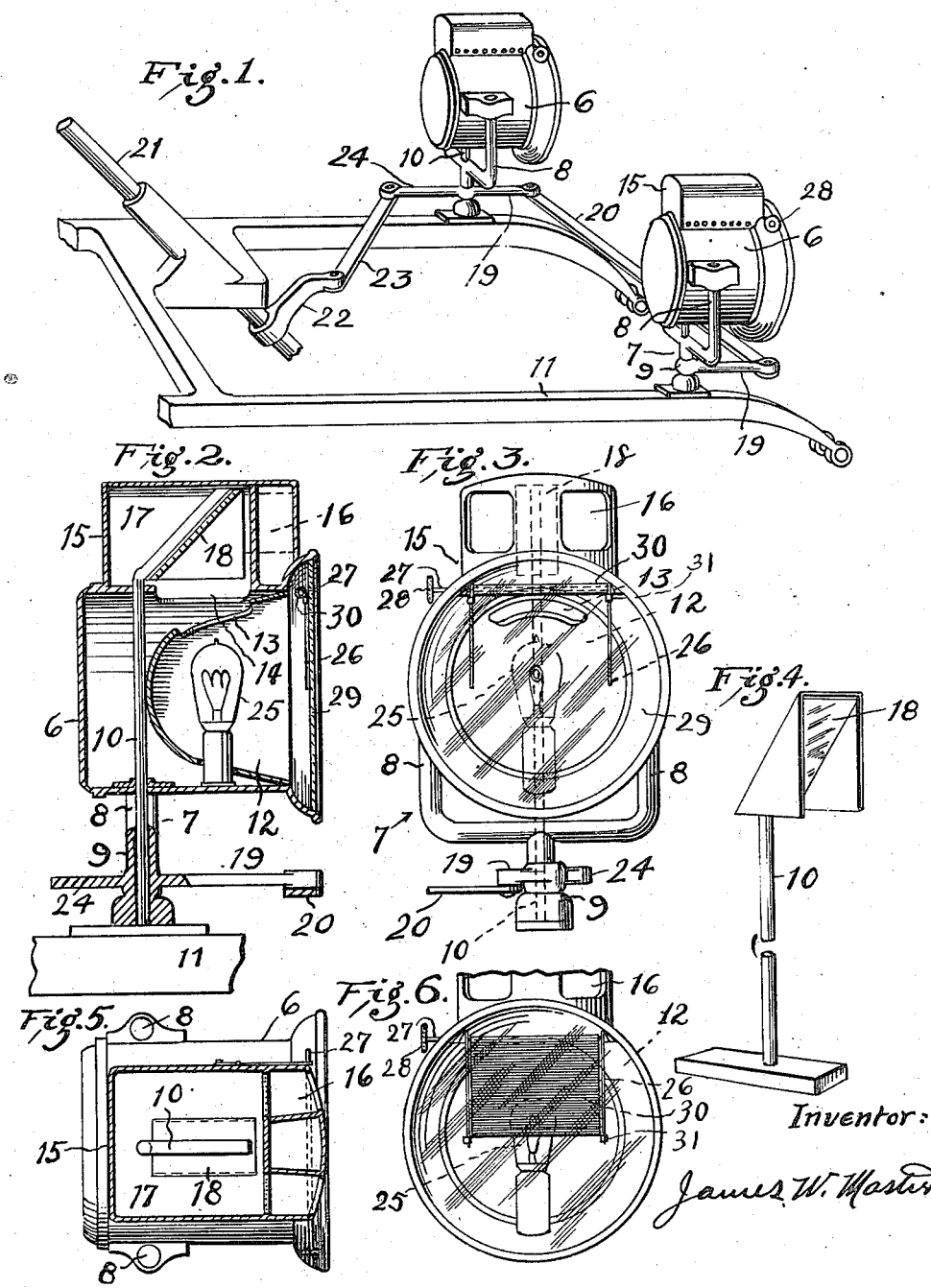

JAMES W. MASTER, OF LOS ANGELES, CALIFORNIA.

AUTOMATIC SWIVEL-LAMP.

1,260,696.

Specification of Letters Patent. Patented Mar. 26, 1918.

Application filed May 27, 1916. Serial No. 100,342.

*To all whom it may concern:*

Be it known that I, JAMES W. MASTER, a citizen of the United States, residing at Los Angeles, in the county of Los Angeles and State of California, have invented a new and useful Automatic Swivel-Lamp, of which the following is a specification.

My invention has relation to automobile head-lights which turn in conjunction with the turning of the steering post, and the objects of the invention are to provide a means for automatically turning the lamps in the direction in which the steering wheels are turned, to provide a means whereby a signal light of a different color will be displayed above the main search light and in the direction of the body of the automobile.

In the devices in use at present the head-lights in some cases do not turn with the turning movement of the steering wheels, thus the path of travel of the automobile is not lighted in turning corners or circular paths. Other devices have means for turning the head-lights with the turning of the automobile, and in this case no signal light indicates the position of the vehicle to another vehicle approaching from the same direction or from the opposite direction.

I avoid these difficulties and objections, by providing a post fixed to the frame of the automobile, a lamp body swiveled to the post and having a light and a reflector therein, a second reflector in the upper part of the body and fixed to the post, and apertures within the body whereby the light is displayed from the second reflector when the lamp body is turned, the invention comprising means connecting the lamp body with the steering post of the automobile so that the lamps are rotated in turning the steering wheel.

In this invention I provide a means whereby a signal is automatically displayed in the direction of the path of travel of the vehicle when steered in a straight direction, and from a straight direction, and further provide a secondary signal which is displayed in the direction still pursued by the vehicle in the period of time elapsing between the turning of the steering post and the time when the vehicle body and wheels are again alined in the new direction the vehicle is to be steered.

Another object of the invention is the provision of a simple dimming device of the lamp. I accomplish this object by constructing the lamp with a curtain or screen of a resilient material which is normally drawn up on a roller but which may be extended down in front of the light bulb if desired. This screen is arranged to extend down in front of the upper half of the light bulb, thereby shielding the glare of the upper portion of the light from approaching vehicles, but allowing the lower portion of the light from the lamp to illuminate the path of the vehicle.

Other objects and advantages may appear from the subjoined detail description and claims.

For a better explanation of the invention, reference is to be had to the accompanying drawings which show a preferred embodiment thereof.

Figure 1 is a perspective of a fragment of an automobile frame with my improved signal lamps attached, showing the operative connecting means between the lamps and the steering post (a portion only of which is shown).

Fig. 2 is a vertical sectional elevation of the lamp.

Fig. 3 is a front elevation of the lamp.

Fig. 4 is a perspective detail of the pivot post and top reflector.

Fig. 5 is a sectional plan of the lamp.

Fig. 6 is a fragmental front elevation of the lamp body, showing the curtain down in the position of dimming the light.

Assuming the invention to be embodied as illustrated, the lamp bodies 6 are each mounted on a support 7 which consists of the forks 8 and the standard 9, the support 7 rotating upon the rod 10 which extends through the lamp standard 9 and forms a pivot member for the lamp.

The rods 10 are fixed to the automobile frame 11, a portion of which is shown.

As the lamps are practically duplicates, a description of one of them will suffice.

The lamp body 6 is provided with a parabolic reflector 12, fixed therein, and swinging with the lamp, the reflector 12 having an aperture 13 in the top and the lamp having a corresponding aperture 14. The lamp bonnet 15 has two apertures 16 on the front face thereof, and a chamber 17 containing the 45° reflector 18, which is fixed to the rod 10.

Within the lamp body 6, two downwardly extending guide rods 26 are secured, and a transverse roller 27, having an operating knob 28, rotatively mounted in the upper part of the lamp body adjacent to the glass 29. The roller 27 carries a resilient curtain 30, which is normally wound upon the roller but may be extended downward so as to obscure the upper portion of the light rays, the curtain having sleeves 31 which travel upon the guide rods 26. Turning the knob 28 will lower the curtain.

The standards 9 on each lamp are provided with operating arms 19 which are connected by a bar 20, whereby the lamp bodies 6 are actuated in unison, and the steering post 21 has an operating arm 22 which is connected by a resilient link 23 with the operating bar 24 on one of the lamps, thereby causing the lamps to be actuated in unison with the steering post. It may be seen that by this arrangement, the lamps are operated from the steering post and no jar or vibration occurs as would be the case if the lamps were actuated by the bar that connects the wheels, neither is the lamp actuating mechanism affected by the action of the vehicle springs.

The front portion of the lamp bonnet is so arranged that when the lamp is in alinement with the vehicle body the light rays from reflector 18 are obscured but when the lamps are turned one or the other of apertures 16 is brought into alinement with the reflector and a signal light is displayed from the lamp bonnet. Any source of light may be employed, and in this case an incandescent bulb 25 is shown, the rays therefrom illuminating both reflectors.

From the foregoing it may be seen that I have provided simple and efficient means for accomplishing the objects of the invention, and, while the elements shown and described are well adapted to serve the purposes for which they are intended, it is to be understood that no limitation is made to the precise construction shown, but various changes and alterations may be made which may fall within the scope of the appended claims, the essence of the invention comprising swivel lamps arranged to display one set of lights continuously in the direction the vehicle is steered, and another set of lights in a different direction when the vehicle has a curved path of travel.

I claim:

1. A swivel lamp comprising a lamp body and a holder therefor provided with a vertically disposed stem, a pivot rod secured to the frame and extending through the stem, a reflector fixed to the pivot-rod and mounted in the upper part of the lamp body, a reflector of parabolic form in the lower part of the body, an incandescent bulb at the focal center of the parabolic reflector, and means connecting the lamp stem and the steering post of the vehicle to shift the lamp in accordance with the movement of the steering wheel.

2. In a swivel lamp, a lamp body and a holder therefor provided with a vertically disposed stem, a pivot rod secured to the frame and extending through the stem, a bonnet above the lamp body having two apertures at the forward part, a parabolic reflector in the lamp body and swinging with the motion of the lamp body, an incandescent bulb in the focal center of the parabolic reflector, and a plane reflector in the lamp bonnet inclined at an angle of 45° and fixed to said pivot rod, said plane reflector deflecting a portion of the rays through the apertures when the lamp body is turned.

3. In a swivel lamp, a lamp body and a holder therefor provided with a vertically disposed stem, a pivot rod secured to the automobile frame and extending through said stem, a reflector fixed to the pivot rod and stationary relative to the frame, a reflector fixed to the lamp body and swinging with the lamp body, an incandescent bulb serving both reflectors, and means for oscillating the lamp body upon the pivot rod.

4. In a swivel automobile lamp, a lamp body and a holder therefor having a vertically disposed stem, a pivot rod secured to the automobile frame and extending through said stem, actuating arms on said stem, a steering post having an actuating arm, and a resilient link connecting member between the steering post arm and the lamp stem actuating arm.

5. In an automobile swivel headlight, a pivot rod fixed to the frame of the automobile, a lamp body oscillatable on the pivot rod, a bonnet above the lamp body above the front provided with two apertures, an incandescent bulb in the lamp body, a reflector in the lamp body to project the rays from the bulb in parallelism with the lamp body, and a reflector in the bonnet to project the rays from the bulb in parallelism with the frame of the automobile, and means for swinging the lamp body in accordance with the direction of the path of travel of the automobile.

6. In an automobile swivel head-light, a fixed pivot rod extending vertically from the frame of the automobile, a lamp body oscillating upon the vertical rod, an incandescent bulb in the lamp body, a reflector to project the rays of light in parallelism with the lamp body and a reflector above the light bulb to project rays of light in a direction angular to the position of the lamp body, and means for turning the lamp body when the vehicle is steered in a circular path.

7. In an automobile head-light, a fixed pivot rod extending vertically from the frame, a lamp body oscillating upon the pivot rod, a bonnet above the lamp body having two apertures, a reflector in the lamp body and fixed thereto, a second reflector in the lamp bonnet and fixed to the vertical pivot rod, and means for actuating the lamp body so that the apertures are alternatively brought into alinement with the second reflector.

8. In an automobile head-light, the combination with the automobile frame and steering post, of vertical pivot rods extending from the frame, lamp bodies swinging thereon, incandescent bulbs in the lamp bodies, bonnets for the lamp bodies having two apertures, a reflector in each lamp body to project the rays of light in parallelism with the lamp body, and a reflector in each bonnet and fixed to the vertical rods, said last named reflector alternatively projecting rays of light through said apertures when the body is turned.

9. In an automobile head-light, a fixed post attached to the automobile frame, a lamp body swinging thereon, a reflector fixed to said post, a second reflector fixed to the lamp body and swinging in unison therewith, and an incandescent bulb common to both reflectors.

In testimony whereof I hereto affix my signature this 18th day of May, in the year 1916.

JAMES W. MASTER.

In the presence of—
LEE EICHOLTZ,
J. B. MILHOUSE.

Copies of this patent may be obtained for five cents each, by addressing the "Commissioner of Patents, Washington, D. C."